(12) United States Patent
Marty et al.

(10) Patent No.: US 8,515,593 B2
(45) Date of Patent: Aug. 20, 2013

(54) FLIGHT MANAGEMENT SYSTEM OF AN UNMANNED AIRCRAFT

(75) Inventors: Nicolas Marty, Saint Sauveur (FR); François Coulmeau, Seilh (FR); Xavier Boone, Toulouse (FR)

(73) Assignee: Thales, Neuilly sur Seine (FR)

( * ) Notice: Subject to any disclaimer, the term of this patent is extended or adjusted under 35 U.S.C. 154(b) by 314 days.

(21) Appl. No.: 13/080,372

(22) Filed: Apr. 5, 2011

(65) Prior Publication Data
US 2011/0245997 A1  Oct. 6, 2011

(30) Foreign Application Priority Data
Apr. 6, 2010  (FR) ...................................... 10 01408

(51) Int. Cl.
*G05D 1/00*  (2006.01)

(52) U.S. Cl.
USPC ............ 701/2; 701/24; 701/3; 701/11; 701/4; 701/16

(58) Field of Classification Search
USPC ................. 701/2, 11, 467, 123, 16, 4, 99, 24, 701/23, 3; 244/195, 1 R, 194, 76 R; 96/111, 96/115; 700/83; 340/963; 95/130; 370/208; 380/270; 375/130
See application file for complete search history.

(56) References Cited

U.S. PATENT DOCUMENTS

| | | | |
|---|---|---|---|
| 5,835,879 A * | 11/1998 | Bush | 701/123 |
| 6,154,637 A | 11/2000 | Wright et al. | |
| 6,643,580 B1 * | 11/2003 | Naimer et al. | 701/467 |
| 7,698,026 B2 * | 4/2010 | Dey et al. | 701/3 |
| 2004/0254691 A1 | 12/2004 | Subelet | |
| 2006/0069497 A1 | 3/2006 | Wilson, Jr. | |
| 2009/0150114 A1* | 6/2009 | Vock et al. | 702/141 |
| 2009/0326736 A1* | 12/2009 | Waid | 701/3 |
| 2010/0049376 A1* | 2/2010 | Schultz | 701/2 |
| 2010/0292874 A1* | 11/2010 | Duggan et al. | 701/11 |
| 2011/0130913 A1* | 6/2011 | Duggan et al. | 701/23 |
| 2012/0123628 A1* | 5/2012 | Duggan et al. | 701/24 |

FOREIGN PATENT DOCUMENTS

| | | |
|---|---|---|
| FR | 2 913 799 A1 | 9/2008 |
| WO | 2004/027732 A1 | 4/2004 |

* cited by examiner

*Primary Examiner* — Behrang Badii
(74) *Attorney, Agent, or Firm* — Baker Hostetler LLP

(57) ABSTRACT

A flight management system of an unmanned aircraft linked to a control station by communication means includes: a first set of a number N of successive navigation functions ($i_{ND}$ with i=1, ... N) remotely situated within the control station, a control function on board the aircraft, generating, from guidance setpoints, commands intended to control the aircraft so that it observes the guidance setpoints, and a second set of a number N of successive navigation functions ($i_{NE}$, with i=1, ... , N) on board the aircraft, and configuration means, capable of performing a combination of a number N of successive functions, each of the successive functions being chosen from the first and second sets, said combination of successive functions generating the guidance setpoints transmitted to the onboard control function.

10 Claims, 6 Drawing Sheets

FLIGHT MANAGEMENT SYSTEM OF AN UNMANNED AIRCRAFT

CROSS-REFERENCE TO RELATED APPLICATION

This application claims priority to foreign French patent application No. FR 1001408, filed on Apr. 6, 2010, the disclosure of which is incorporated by reference in its entirety.

TECHNICAL FIELD

The field of the invention is that of the piloting systems for unmanned aircraft. The unmanned aircraft are, for example, drones, also called UAV ("Unmanned Aerial Vehicle"). The expression "drone system" covers the assembly formed by a drone and its piloting station linked by a communication link.

BACKGROUND

Conventionally, a flight management system of an unmanned aircraft comprises, within said control station, a set of successive navigation functions and, within the aircraft, a control function for the aircraft based on guidance setpoints which are roll, pitch, thrust and speed constraints that the aircraft is assumed to have to observe. The control function drives the aerodynamic equipment of the aircraft (control surfaces, engines) so that it observes the guidance setpoints. In conventional drone systems, the implementation of all the successive navigation functions hosted by the control station generates guidance setpoints.

The drones are more and more regularly required to cross civilian airspaces to reach their theatre of operations, for training requirements, internal civil safety requirements or for monitoring requirements (forest fires, borders, events, etc.).

Now, for an aircraft to be able to cross a non-segregated airspace, it must be authorized therein. A non-segregated airspace is a space that is reserved neither for civilian applications nor for military applications but which may accommodate both types of applications, unlike a segregated airspace which is dedicated to one of these two applications. Authorization to navigate in a non-segregated airspace entails demonstrating that the aircraft can observe strict safety conditions.

The ICAO (International Civil Aviation Organization) has thus defined the CNS (Communication/Navigation/Monitoring) safety concept which combines, by categories and missions, the systems and procedures on the ground and on board the aircraft that make it possible to achieve the safety objectives. The communication C represents the interchanges between the aircraft and the air traffic control authorities ACT or between an aircraft and its piloting station. The navigation N relates to the location of the aircraft (where am I?), the flight management (where should I go?) and to guidance (how do I go there?). The monitoring aspect S relates to the detection of upcoming obstacles with regard to the landscape, other aircraft, or hazardous weather conditions. A performance characteristics is allocated to each of these key aspects C, N and S, in order to obtain the required safety level. The demonstration that makes it possible to obtain a navigability certificate therefore relies on the C/N/S performance characteristics s and their interactions. In particular, it is essential to demonstrate that the failure of one of the C, N, S components can be compensated for by other components to terminate the flight in safety conditions which are adequate.

Now, the piloting systems for the current drones do not make it possible to observe the safety conditions necessary for inclusion in civilian traffic. For example, in the case of failure of the communication between the piloting station and the drone, the latter cannot continue its mission with adequate safety conditions because it is normally entirely piloted from the ground. The guidance setpoints are generated by implementation of a set of successive navigation functions within the control station. The aircraft itself is not capable of generating guidance setpoints. The drones must therefore observe stringent procedures in order to be able to cross civilian spaces: several days' prior notice, accompanying aeroplanes, closure of civilian traffic for a time period.

SUMMARY OF THE INVENTION

The present invention proposes a flight management system of an unmanned aircraft which enables it to cross segregated or non-segregated airspaces.

To this end, the subject of the invention is a flight management system of an unmanned aircraft linked to a control station by communication means, said flight management system comprising:

a first set of a number N of successive navigation functions remotely situated within the control station, a control function on board the aircraft, generating, from guidance setpoints, commands intended to control the aircraft so that it observes the guidance setpoints, a second set of a number N of successive navigation functions on board the aircraft, configuration means, capable of performing a combination of a number N of successive functions, each of the successive functions being chosen from the first and second sets, said combination of successive functions generating the guidance setpoints transmitted to the onboard control function.

In one embodiment of the invention, the first, and respectively the second, sets of successive functions comprise the following three successive navigation functions:

a remote flight plan construction function, and respectively an onboard flight plan construction function, a remote future trajectory construction function, and respectively an onboard future trajectory construction function, a remote guidance function, and respectively an onboard guidance function.

Advantageously, the flight management system comprises a performance database on board the aircraft and a remote performance database.

Advantageously, the system comprises a remote navigation database and an onboard navigation database storing navigation data.

Advantageously, the configuration means of the flight system are capable of choosing the origin of the guidance setpoints used by the flight plan management function belonging to the combination from remote means for communication with the air traffic control authorities and/or onboard means for communication with the air traffic control authorities and/or onboard guidance setpoint generation means.

In one embodiment, the configuration means of the system configure the flight system according to required navigation performance characteristics.

The required navigation performance characteristics s advantageously depend on at least one navigation parameter and/or at least one certification parameter and/or at least one economic and technical parameter. The required navigation performance characteristics s are, for example, predetermined. As a variant, the required navigation performance characteristics s are variable during a mission of the aircraft.

Advantageously, for at least one serial number i between 1 and N, the remote navigation function of serial number i is equal to the onboard function of serial number i.

By providing a set of successive navigation functions both within the control station and on board the aircraft as well as configuration means for the flight management system, the aircraft can fly both in segregated and non-segregated spaces.

Moreover, the configuration means of the navigation system can implement combinations or successive navigation functions chosen from the onboard and remote navigation functions. Thus, a choice can be made to execute all or part of the navigation functions on board the aircraft only when that is necessary to ensure the safety of the aircraft. This makes it possible, while offering an unmanned aircraft the possibility of flying in civilian spaces, of not mobilizing, on board the aircraft, superfluous energy to implement navigation functions when it is not necessary.

It is also not necessary to provide, on board the aircraft, a computer with computation capacity permanently dedicated to the execution of the set of navigation functions. Thus, the weight of the aircraft is not increased unnecessarily compared to that of an unmanned aircraft of the prior art. In fact it is possible to equip the aircraft with a computer which does not have sufficient computation capacity to simultaneously implement the mission functions, the successive navigation functions and the other onboard functions. This is all the more beneficial since the higher the level of autonomy needed to ensure the safety of the aircraft, the smaller the number of mission functions that have to be carried out (the aircraft does not generally have to carry out mission functions when it is in a civilian space).

BRIEF DESCRIPTION OF THE DRAWINGS

Other features and advantages of the invention will become apparent from reading the following detailed description, given as a nonlimiting example, and with reference to the appended drawings in which.

From one figure to another, the same elements are identified by the same references.

DETAILED DESCRIPTION

Figure 1:
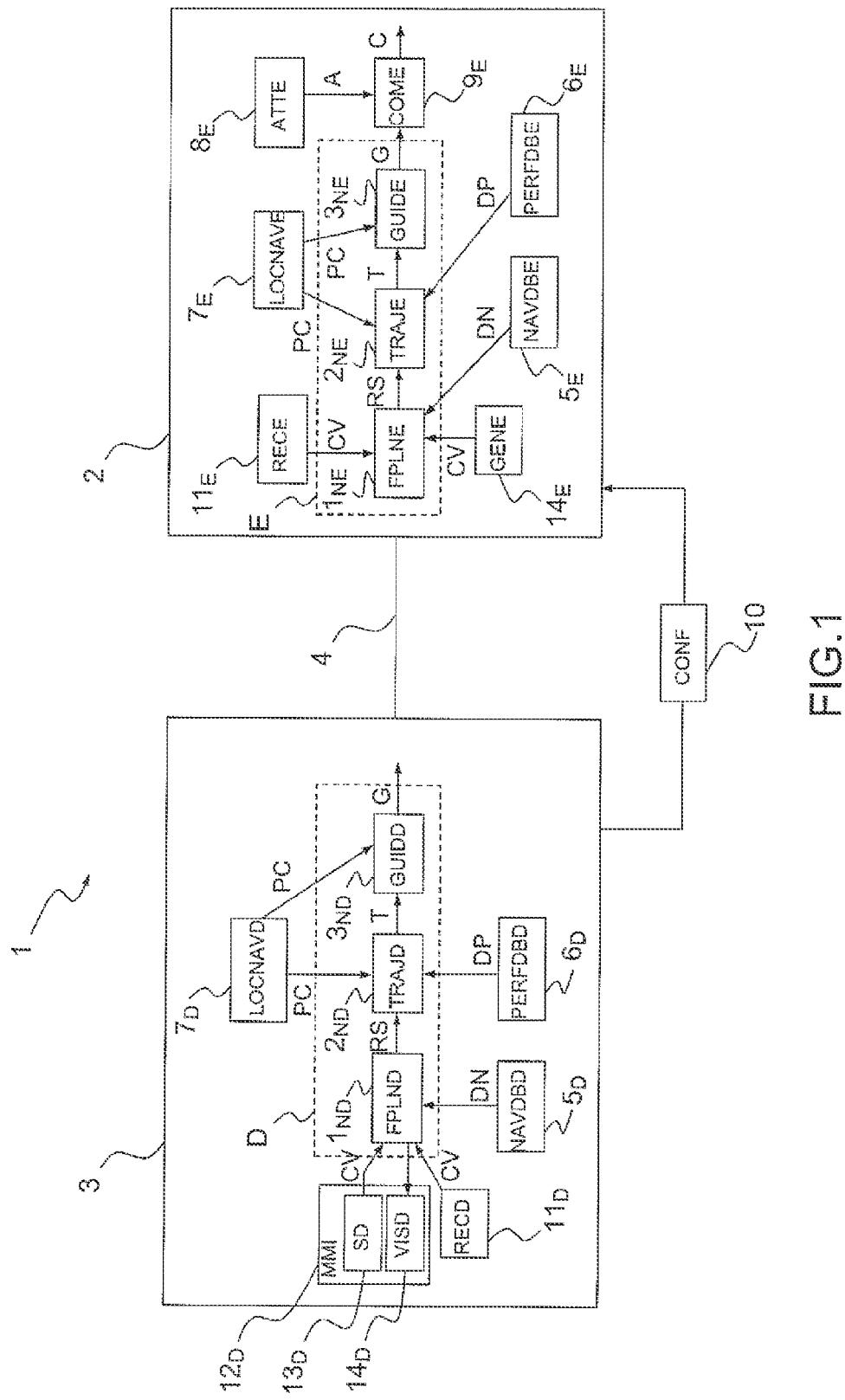
FIG. 1 schematically represents an exemplary architecture of a flight management system according to the invention.

FIG. 1 shows an exemplary flight management system 1, according to the invention, for an unmanned aircraft 2 and linked to a control station 3 by communication means 4. This flight management system 1 comprises:

a first set D of a number N of successive navigation functions $i_{ND}$ of serial number i with i=1, . . . N, remotely situated within the control station, a control function COME $9_E$ on board the aircraft, generating, from guidance setpoints G, commands intended to control the aircraft so that it observes the guidance setpoints G, a second set E, of a number N of successive navigation functions $i_{ND}$ of serial number i with i=1, . . . N, on board the aircraft, configuration means CONF 10, for the flight management system 1, capable of performing a combination of N successive functions, each of the successive functions being chosen from the first and second sets D, E, said combination of successive functions generating the guidance setpoints G which are transmitted to the onboard control function COME.

In other words, the configuration means CONF, 10 perform combinations C of N successive functions of serial number i with i=1, . . . , N. The combination C comprises, for each serial number i, either the onboard navigation function $i_{NE}$ of index i, or the remote navigation function $i_{ND}$ of index i. A function that has a first serial number is performed before the function that has the higher serial number than the first serial number.

In the example shown in FIG. 1, the first, and respectively the second set of successive functions comprise a number N=3 of successive navigation functions which are as follows:

a remote flight plan construction function FPLND, $1_{ND}$, respectively an onboard flight plan construction function FPLNE, $1_{NE}$, a remote future trajectory construction function TRAJD, $2_{ND}$, respectively an onboard future trajectory construction function TRAJE, $2_{NE}$, a remote guidance function GUIDD, $3_{ND}$, respectively an on board guidance function GUIDE, $3_{NE}$.

Advantageously, the remote successive navigation functions are identical to the onboard successive navigation functions. This makes it possible to guarantee identical behaviour of the craft, whether the navigation functions are carried out on board the aircraft or remotely.

As a variant, these functions are different. In other words, the onboard and remote functions correspond to the same function but they are not carried out in the same way. Such is, for example, the case when the aircraft has an existing item of equipment for the mission that is capable of carrying out one of the navigation functions. This equipment item can be used to carry out the navigation function on board the aircraft.

The abovementioned functions are described in more detail hereinbelow:

the flight plan management functions FPLND, FPLNE construct a route RS (or outline of a trajectory to be followed) that is assumed to have to be followed by the aircraft based on navigation data DN and/or flight setpoints CV; the route comprises the vertical constraints in altitude, speed and time that the aircraft is assumed to have to observe, the functions TRAJD, TRAJE for constructing a future trajectory T correspond to an estimation of the three-dimensional trajectory, beginning at its current position PC, that the aircraft is assumed to have to follow for a predetermined time interval, the trajectory being constructed from the route to be followed RS and observing the performance characteristics of the aircraft DP, the guidance functions, GUIDD, GUIDE calculate, from the current position PC of the aircraft and from the three-dimensional trajectory, guidance setpoints G (in the vertical plane and in the horizontal plane) which are high-level instructions tending to ensure that the aircraft is locked onto the horizontal and vertical planes and in speed, along the trajectory, the control function COME generating commands for the aerodynamic equipment items of the aircraft to observe the guidance setpoints.

The exemplary flight management system according to the invention, represented in FIG. 1, also comprises:

a remote navigation database NAVDBD $5_D$ and an onboard navigation database NAVDBE, $5_E$, storing navigation data DN comprising geographical points, navigation radiofrequency beacons, intercept segments, altitude segments, take-off and landing procedures, runways; these data are standardized at international level by the AEEC, in the AEEC document ARINC 424, a remote performance database PERFDBD $6_D$, and an onboard performance database PERFDBE $6_E$, storing data DP relating to the performance characteristics of the aircraft such as aerodynamic parameters, aerodynamic characteristics of the engines of the aircraft, a remote locating function LOCNAVD $7_D$ for the aircraft to calculate the current position PC of the aircraft in latitude and longitude from sensors located remotely from the aircraft (for example, radars) and an onboard locating function LOCNAVE, $7_E$, for calculating the current position PC of the aircraft from onboard sensors in the aircraft (inertial sensors, GPS sensors), an onboard function ATTE, $8_E$ for determining the attitude A of the aircraft, comprising the pitch, roll, yaw, incidence, angular speeds of the aircraft, from a sensor installed on board the aircraft, means of communication with the air traffic control authorities, remote RECD, $11_D$, and onboard RECE, $11_E$ making it possible to receive flight setpoints CV from an air traffic control authority ATC, a remote man-machine interface MMI, $12_D$ enabling a giver of instructions (the pilot of the aircraft who is remotely situated within the control station) to interact with the navigation functions; this man-machine interface MMI comprises input means SD $13_D$ for inputting flight setpoints CV intended for the flight plan management function FPLN and display means VISD $14_D$ for displaying information deriving from the navigation functions, onboard generation means GENE, $16_E$ for generating flight setpoints.

The inputting of the data by means of the man-machine interface by the pilot (who is remotely situated in the control station) is done in close association with the database which contains all the possible selectable elements. Each time the operator tries to insert an element, a check is carried out to see if this element is present in the navigation database. For some procedure elements, the navigation database makes it possible to filter and sort the selectable elements on said procedure (for example, when the operator selects an airport, the database provides him with a list to choose from, the associated take-off runways, the list of associated standardized departure procedures, etc.).

The flight setpoints CV are, for example, constraints, elements of the route to be followed, or parameters which have an influence on the flight, such as weather predicted along the flight plan or in a given region.

The navigation and performance databases are not necessarily duplicated. As a variant, these databases are hosted only within the control station or only on board.

FIG. 1 shows the means for configuring CONF, 10, the flight management system outside the control station 3 and the aircraft 2. They are, for example, installed within an air traffic control authority ATC. As a variant, these means 10 are installed in the control station or on board the aircraft.

FIGS. 2a to 2e show different configurations of the flight management system represented in FIG. 1. The different configurations differ by the combination of successive functions chosen by the configuration means 10, and possibly by the origin of the data and/or of the flight setpoints and/or of the locating functions used.

For each configuration, for greater clarity, only the following are shown:
the navigation functions which belong to the combination chosen for the configuration,
the onboard control function COME, the attitude determination function ATTE, the display function VISD, the navigation databases NAVDBE or NAVDBD and performance databases PERFDBE or PERFDBD used by the flight plan function of the combination,
the locating function or functions which provide position measurements P to the navigation functions which belong to the chosen combination,
the means from among SD, MMI, RECD, RECE, GENE from which the flight setpoints CV are transmitted to the flight plan management function FPLNE or FPLND included in the combination.

Nor is the communication link 4 shown.

Figure 2A:
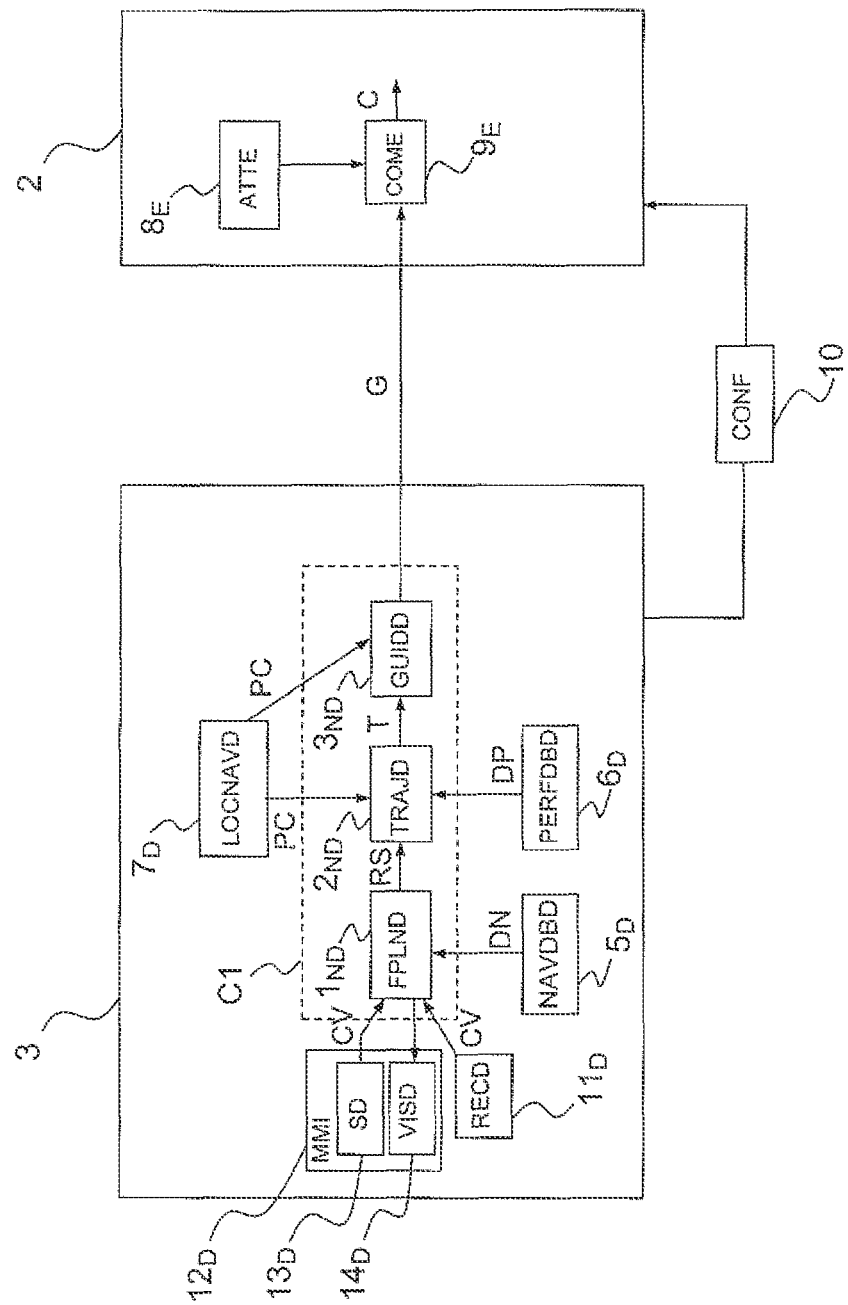
FIGS. 2a to 2e represent different configurations of the flight management system according to the invention.

FIG. 2a shows a first configuration. In this configuration, it is a first combination C1 of successive navigation functions which generates the guidance setpoints G which are transmitted to the onboard control function COME. Since the guidance setpoints G are generated within the control station 3, they are transmitted to the aircraft 2 by means of the communication link 4.

The first combination C1 comprises only remote navigation functions FPLND $1_{ND}$, TRAJD $2_{ND}$, GUIDD $3_{ND}$. None of the onboard navigation functions is involved in generating the guidance setpoints G. A navigation function belonging to a combination of successive navigation functions uses the data deriving from the preceding navigation function of the combination.

In the first configuration, the remote flight plan construction function FPLND, $1_{ND}$ uses the navigation data stored in the remote navigation database NAVDBD, $5_D$. The remote future trajectory generation function TRAJD uses the data from the remote performance database PERFDBD, $6_D$.

Moreover, the remote future trajectory construction function TRAJD, $2_{ND}$, and the remote guidance function GUIDD, $3_{ND}$ use the current position PC calculated by the remote locating function LOCNAVD, $7_D$.

The flight setpoints CV used by the remote flight plan management function FPLND may be obtained from the setpoint input means $13_D$ and/or from the remote means RECD, $11_D$, for receiving flight setpoints.

The only functions that are carried out on board the aircraft are the control piloting function COME $9_E$ and the attitude determination function ATTE, $8_E$. In this configuration, the aircraft 2 has no autonomy (level 0 configuration in terms of autonomy) with regard to the control station 3. It is said that the control of the aircraft is fully remote.

Advantageously, the configuration means CONF 10 of the flight management system are capable of determining which current positions PC, from among the current positions PC calculated by the onboard LOCNAVE and remote LOCNAVD locating functions, are used by the trajectory determination function and respectively by the guidance function which belong to the combination. Thus, it is possible to obtain a variant of the first configuration described hereinabove in which the remote guidance GUIDD and trajectory construction TRAJD functions use the position calculated by the onboard locating function LOCNAVE, $7_E$. The current position PC is then transmitted to these functions from the aircraft via the communication link 4. The use of the position calculated by the onboard locating function LOCNAVE enables an aircraft to cross a number of military airspaces, belonging to different countries, in which there is not always the benefit of radars for remote locating.

The first configuration is mainly used in segregated spaces or in airspaces that do not require the safety conditions imposed in civilian space to be observed. In the case of failure of the communication link 4 or in the case of failure of the locating system, the aircraft does not have the capacity to observe the safety constraints of a civilian space because it is not capable of generating the guidance setpoints G itself. However, the computers of the aircraft devote no computation capacity (and therefore no energy) to carrying out the navigation functions. In other words, for a given energy reserve, the aircraft has great autonomy (in terms of energy). It has a computation capacity for carrying out mission functions.

Figure 2B:
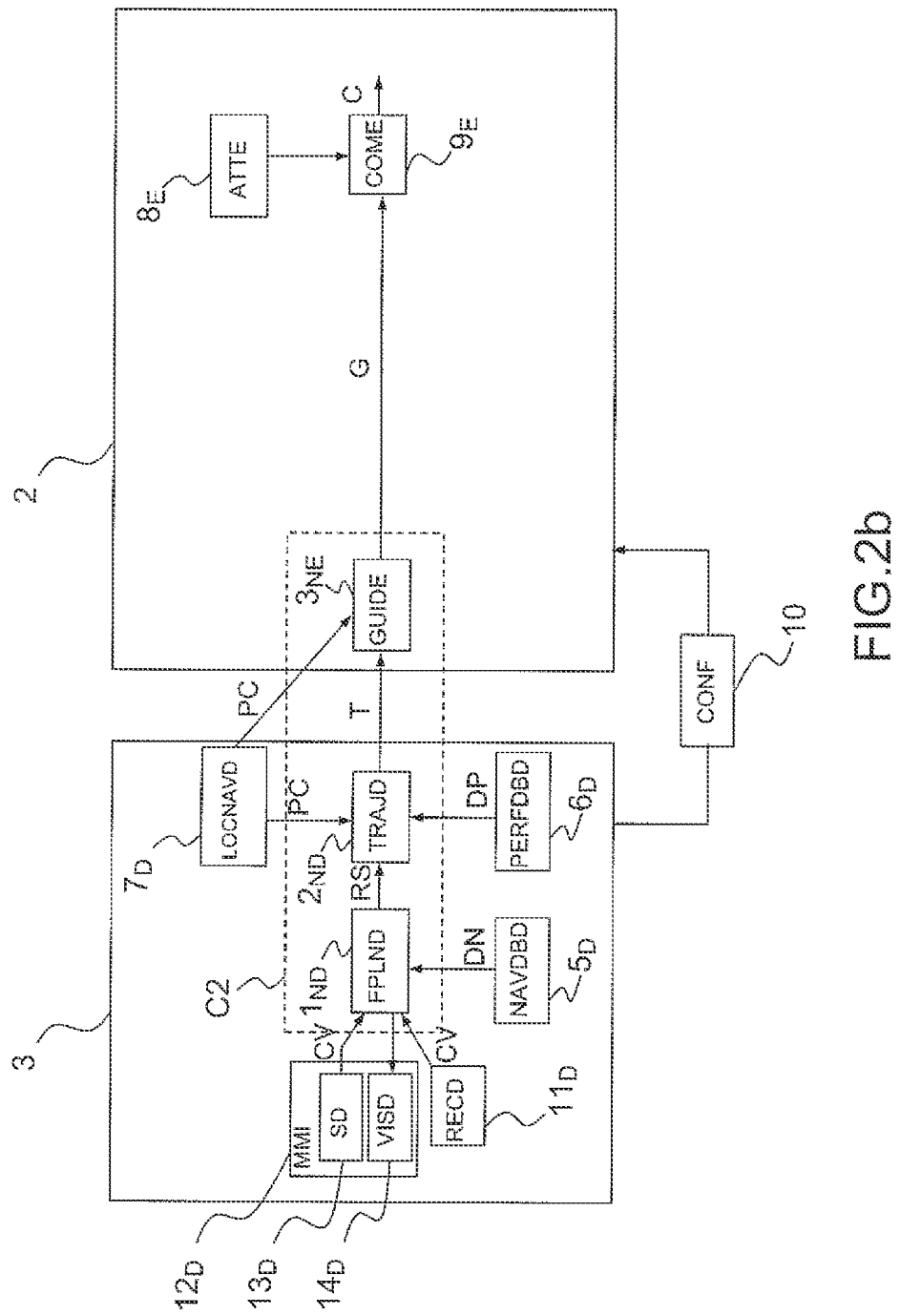

FIG. 2b shows a second configuration of the flight management system according to the invention. The second configuration differs from the first configuration in that a second combination C2 of successive navigation functions generates the guidance setpoints G which are transmitted to the onboard control function COME. The second combination C2 differs from the first combination C1 in that the remote guidance function GUIDD $3_{ND}$ is replaced by the onboard guidance function GUIDE $3_{NE}$.

In FIG. 2b, the onboard guidance function GUIDE and the remote trajectory construction function TRAJD use the current position PC calculated by the remote locating function LOCNAVD. Just as in the first configuration, the second configuration has variants in which the onboard guidance function GUIDE and the remote trajectory construction function GUIDD both use the position PC calculated by the onboard locating function LOCNAVE, $7_E$ or else uses, respectively, the position calculated by the onboard locating function LOCNAVE and the position calculated by the remote locating function LOCNAVD.

In this latter variant, the number of information items transmitted between the aircraft and the control station is limited, which favours the autonomy of the aircraft with respect to the control station, notably in the case of failure of the communication link linking it to its piloting station.

The interchanges between the aircraft and the piloting station therefore amount to the future trajectory T transmitted from the remote trajectory function TRAJD towards the onboard guidance function GUIDE, and possibly to the position PC of the aircraft.

In the case of failure of the communication link between the aircraft and the piloting station for a short time of the order of a few minutes, the aircraft can continue its mission autonomously. In practice, it is capable of establishing guidance commands G for controlling the aircraft based on the future trajectory T which is transmitted to it by the remote trajectory construction function TRAJD. It therefore has the possibility of observing, in the short term, the safety conditions that are imposed in an uncontrolled civilian space or in a military space in training. The second configuration is called level 1 configuration in terms of autonomy of the aircraft with respect to the control station. Moreover, less information passes between the aircraft and the control station than in the first configuration so that a greater bandwidth is available for communications not dedicated to navigation.

Figure 2C:
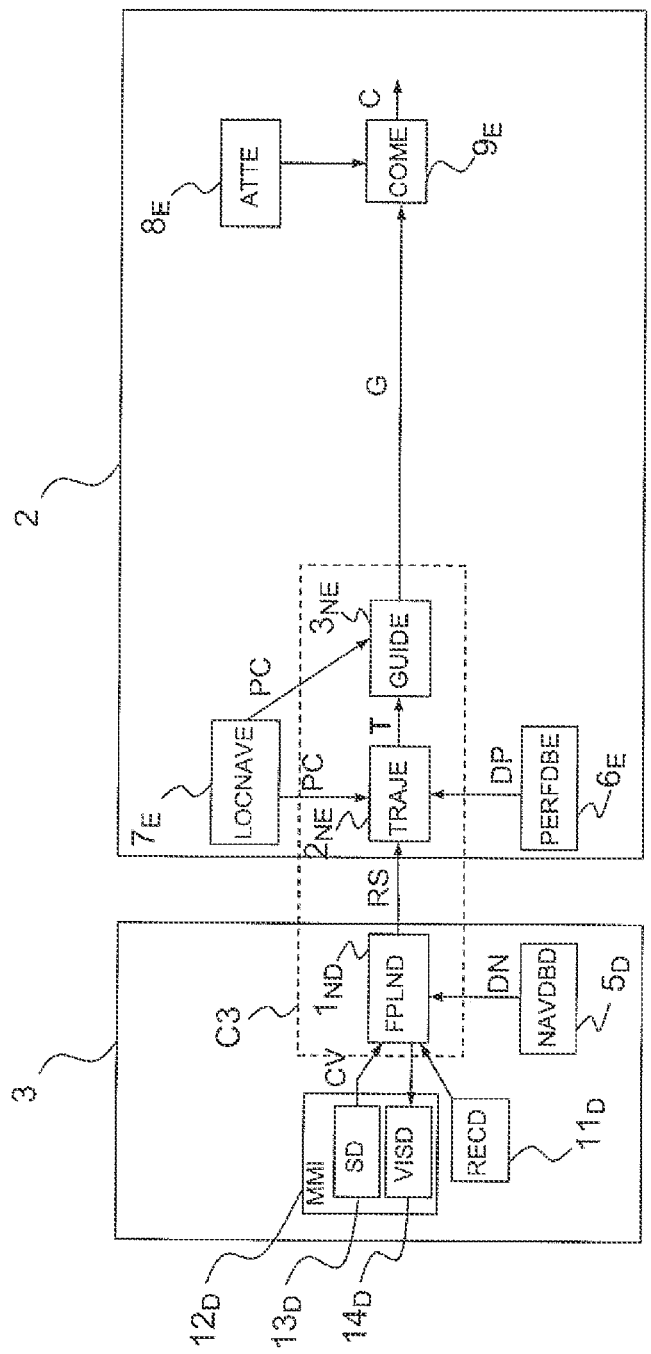

FIG. 2c shows a third configuration of the flight management system according to the invention. The third configuration differs from the second configuration in that it uses a third combination C3 of navigation functions that is different from the second combination C2 in that the remote trajectory construction function TRAJD is replaced by the onboard trajectory construction function TRAJE. The onboard function TRAJE uses notably the route to be followed RS calculated by the remote flight plan management function FPLND $1_{ND}$.

The configuration means 10 are advantageously capable of determining, when the performance database is duplicated, which performance data from among those stored in the onboard PERFDBE and remote PERFDBD databases are used by the trajectory construction function TRAJD or TRAJE belonging to the chosen configuration. Advantageously, the configuration means CONF 10 configure the flight management system 1 so that the onboard function TRAJE, or respectively remote function TRAJD, included in the combination, uses the performance data DP stored in the onboard performance database PERFDBE, respectively remote performance database PERFDBD. Thus, in FIG. 2c, the onboard function TRAJE uses the data stored in the onboard performance database PERFDBE.

In the third configuration, the trajectory generation TRAJE and guidance GUIDE functions use the current position PC of the aircraft calculated by the onboard locating function LOCNAVE. This makes it possible to avoid transmitting the position PC of the aircraft from the control station to the aircraft. Thus, the aircraft has good autonomy with respect to the ground station in the case of failure of the communication link 4. However, the configuration means 10 can choose, for each of these 2 navigation functions, to use, as a variant, the position PC obtained from the locating function, either on board or remote.

It is possible to transmit to the piloting station 3 the portion of the future trajectory calculated on board the aircraft. This portion can thus be displayed by an operator by means of the display means VISD. The interchanges between the aircraft and the control station therefore amount to the sending of the outline of the trajectory RS from the control station 3 and, as an option, the sending, from the aircraft 2, of the position PC of the aircraft calculated by the remote navigation function and possibly the trajectory T calculated by the onboard function.

The third configuration enables an aircraft to cross civilian airspaces in complete safety. It is in fact capable of calculating its trajectory T to the end of its mission from the route to be followed RS which is transmitted to it by the control station 3. It is said that the aircraft has a level 2 of autonomy (greater than level 1) with respect to the control station. In the case of loss of communication between the aircraft and the piloting station, the aircraft is capable of following a mandatory procedure consisting in continuing on the current heading, rejoining its flight plan at the closest point, continuing to the arrival airport by following the flight plan. The flight plan corresponds to all the information needed to describe the flight and the associated constraints that the aircraft must observe. It comprises the route to be followed, the trajectory to be followed and the guidance setpoints.

Figure 2D:
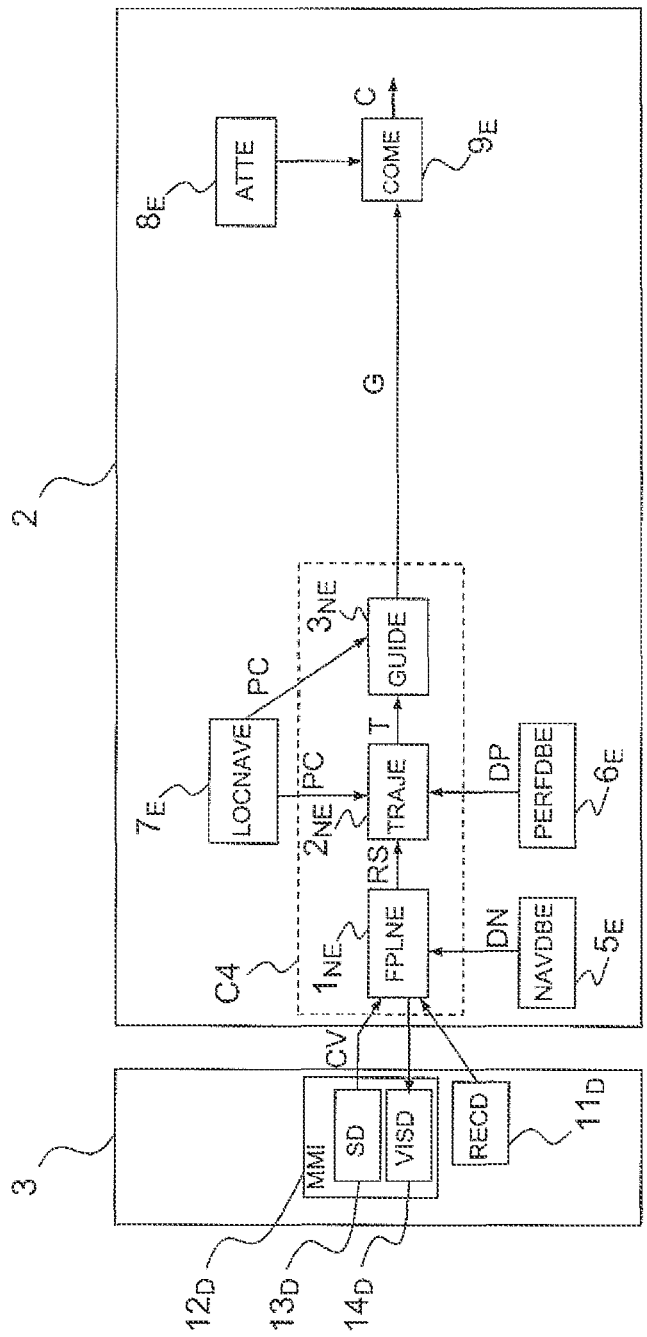

FIG. 2d shows a fourth configuration of the flight management system according to the invention that has a third level of autonomy greater than the preceding ones, with respect to the control station. This fourth configuration differs from the third configuration represented in FIG. 2c in that a fourth combination C4 of successive navigation functions is formed. This fourth combination C4 differs from the third combination C3 in that the remote flight plan management function FPLND is replaced by the onboard flight plan management function FPLNE.

This function FPLNE uses data obtained from the onboard navigation database NAVDBE. This requires the navigation database to be at least partially duplicated. The configuration means 10 of the flight management system are advantageously capable of determining which navigation data DN from among those stored in the onboard navigation database NAVDBE or those stored in the remote navigation database NAVDBD are used by the flight plan management function FPLND or FPLNE which belongs to the combination. It is therefore possible to obtain a variant of the fourth configuration in which the onboard flight plan management function uses the data obtained from the remote navigation database NAVDBD. The use of data obtained from the onboard database gives the aircraft greater autonomy with respect to the piloting station. The onboard flight plan management function FPLNE also uses flight setpoints CV, supplied by the piloting station 3. It is possible to send to the piloting station 3 the route RS and/or the trajectory and/or the position calculated on board.

Advantageously, the configuration means 10 of the flight system are capable of choosing the origin of the guidance setpoints used by the flight plan management function belonging to the combination, from among the remote means of communication $11_D$, with the air traffic control authorities and/or onboard means of communication RECE $11_E$, with the air traffic control authorities and/or onboard guidance setpoint generation means $14_E$.

Figure 2E:
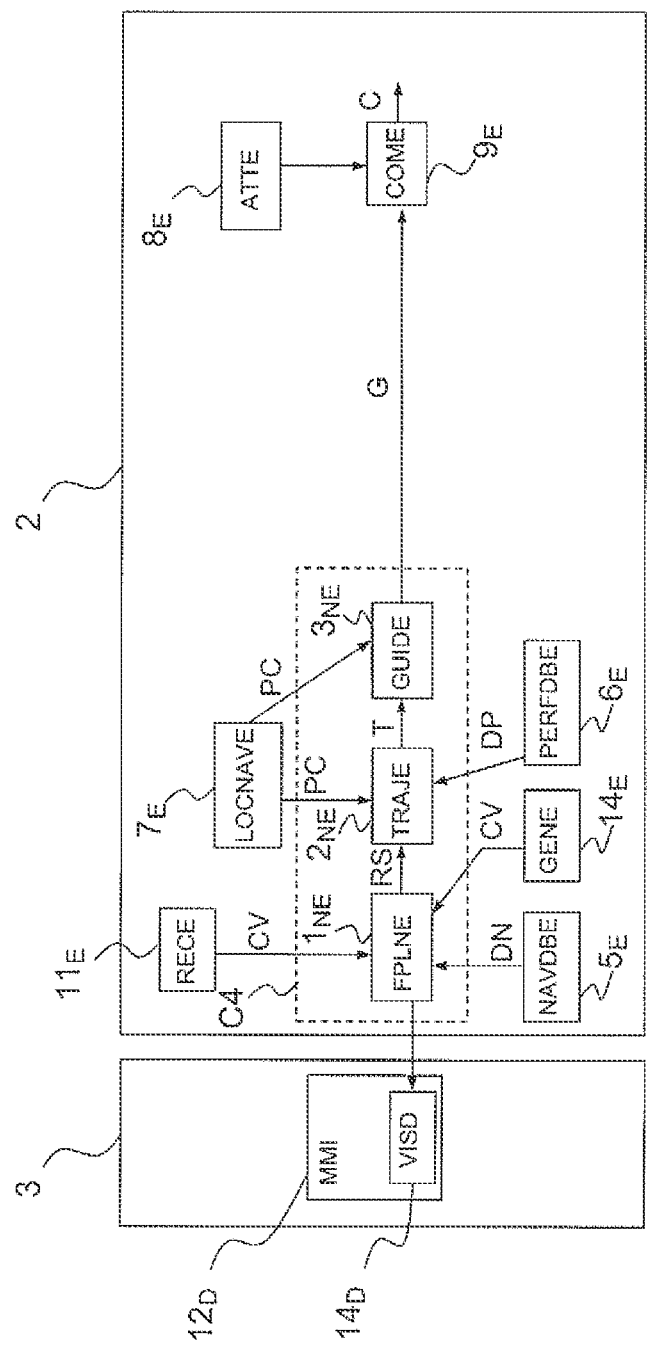

FIG. 2e shows a fifth configuration of the flight management system according to the invention, called level 4 configuration (greater than the third) in terms of autonomy of the aircraft with respect to the control station. This fifth configuration differs from the fourth configuration in that the onboard flight plan management function FPLNE uses flight setpoints CV generated on board the aircraft by the generation means GENE and/or from flight setpoints sent by an air traffic control authority ATC via the onboard means of communication RECE, $11_E$ with the air traffic control authorities. The flight setpoints are, for example, sent from the ATC to the aircraft via a digital data link.

The generation means GENE are, for example, means of monitoring the context or the mission, which transmit information to the onboard function FPLNE.

The aircraft assembles, from the flight setpoints CV, the procedure and flight plan elements from guidance setpoints, then constructs its trajectory, and is locked onto said trajectory.

Compared to the level 3 configuration, this configuration enables the aircraft to dialogue directly with the air traffic control Authorities ATC, without involving the control station, and therefore to be able to continue to respond to the flight setpoints sent by the ATC even if the communication link between the aircraft and the control station is lost.

Advantageously, the means 10 for configuring the flight management system 1 choose the configuration of the flight system according to required navigation performance characteristics. The required navigation performance characteristics may be expressed as a function of at least one parameter P. It is possible to configure the flight system according to at least one navigation parameter and/or at least one certification parameter and/or at least one economic and technical parameter.

There now follows a non-exhaustive list of the various parameters and the configuration, expressed as autonomy level j, with j=0 to 4, which is sufficient, necessary or preferably chosen for different values of the parameter.

The navigation system can be configured according to at least one navigation parameter taken from:
the nature of the airspaces assumed to have to be crossed by the aircraft:
  if the aircraft does not cross any non-segregated airspace, an autonomy level 0 to 2 is sufficient,
  if the aircraft crosses a non-segregated, non-controlled airspace (i.e. in which visual flight rules apply for the monitoring of the other aircraft), it is preferable to choose at least the autonomy level 2 to ensure a reasonable period of time for taking into account potential conflicts with other aeroplanes,
  if the aircraft crosses a non-segregated controlled space (i.e. in which the aircraft has to be capable of rapidly responding to the setpoints from the air traffic control authorities), a level 3 or even 4 is necessary (the level 4 variant in which the flight management function uses flight setpoints which are transmitted to it by the authorities may be necessary if the expected responsiveness is high);

the type of aircraft relative to the required autonomy with respect to the piloting station:
  for a micro drone (drone having low endurance, very low autonomy, low weight and low cost), an autonomy level 0 or 1 is preferable,
  for a tactical drone (drone having low endurance, average autonomy of 1 to 3 h, an average weight and a low cost), an autonomy level 0 to 2 is preferable,
  for a MALE drone (drone having average endurance, average autonomy of 4 to 10 h, heavy weight and high cost), an autonomy level of between 1 and 4 is preferable,
  for a HALE drone (drone having high endurance, high autonomy, that is to say greater than 12 h, heavy weight, very high cost), an autonomy level of 2 to 4 is preferable:

the required lifetime, that is to say the drone associated with the cost of the drone (the more costly the drone, the greater the requirement to retrieve it intact at the end of its mission, and the higher the autonomy level required), the response time of the chain comprising control station and aircraft (the greater this response time of the aircraft with respect to the control station, the greater the tendency to choose a high level of autonomy), the type of airspace crossed relative to the navigation performance characteristics required in this space (that is to say, relative to the precision with which the aircraft is required to follow its flight plan); the greater the demand for good navigation performance characteristics, the higher the chosen autonomy level, the nature of the functionalities and procedures that the aircraft has to be able to carry out; for example, an aircraft that is equipped with an onboard function for autonomous return to the point of departure, that is to say an aircraft which has on board a predefined and non-modifiable return flight plan for returning safely in case of problems, must be capable, in the case of loss of communication with the control station, of constructing a trajectory from this flight plan and of establishing guidance commands from the latter, which entails the presence, on board the aircraft, of the trajectory construction and aircraft guidance functions, autonomy level 4 is required.

It is also possible to configure the flight system from at least one certification parameter relating to the safety level required for the flight, taken from:
  the type of aircraft (in the aircraft classification):
    low weight aircraft, "very light jets" class, ULM, etc., an autonomy level 0 or 1 is preferable,
    business or light aviation class aircraft, an autonomy level 1 to 3 is preferable,
    high-weight aircraft, a level 1 to 4 can be chosen;
  the performance level of the communication and/or monitoring equipment of the aircraft (the level required for the navigation function should complement the levels of the onboard monitoring and communication equipment items):
    if the performance level is high (guarantees that the loss of communication is "improbable") a level 0/1 is sufficient,
    if the performance level is low, a level 2 to 4 will be necessary to limit the dependency of the piloting of the aircraft with respect to the communication link;
  the response time of the control station (pilot to ground) with respect to air traffic control requirements: the longer the response time, the higher the required autonomy level.

It is also possible to configure the flight system from at least one economic technical parameter t, taken from:

the maximum payload weight of equipment dedicated to navigation in non-segregated airspaces: if a supplementary payload weight is authorized (greater memory or processor resources), the autonomy level can be increased.

the energy potential of the aircraft (the more energy there is available for the navigation functions, the more the autonomy level can be increased), the cost of the payload relative to the probability of loss of the craft (without damage for the other users of the airspaces): same classification for the cost of the drone.

The parameters listed above may be predetermined. They are fixed for a given mission, or for a given aircraft. In other words, the required navigation performance characteristics remain the same for a given mission or for a given aircraft. As a variant, at least one of these parameters has a value that is variable during a given mission. In other words, the required performance characteristics are variable during the mission of the aircraft. The configuration means CONF 10 advantageously configure the flight management system dynamically according to the trend of the value of the parameters during the flight. The system is advantageously equipped with a required navigation performance characteristic monitoring system. In other words, the system is advantageously equipped with means for monitoring the value or values of the variable parameter or parameters.

Thus, an aircraft which takes off from an airspace that requires a high safety level can activate a level 3 or 4 function to ensure that the route is followed reliably, even in the case of communication failure. This aircraft then arriving at a theatre of operations (military area) can return to level 0, the mission being run by another system (mission system) that has no particular constraint with respect to non-segregated airspaces.

A minimum required autonomy level can be chosen to ensure the minimum safety level required in the space being crossed. In this way, the aircraft still expends the minimum of energy to perform the navigation functions. Moreover, the energy resources mobilized to perform the navigation functions are minimal. Thus, the flight management system according to the invention enables an aircraft to cross civilian and military spaces without, however, considerably reducing its autonomy.

For example, an aircraft of tactical drone type deployed only in a hostile theatre of operations or in an urban area at low altitude can have a degree of level 0 or 1. A more powerful aircraft, having to perform a longer mission, taking off from civilian runways and crossing non-segregated spaces and flight levels will have to be at least level 3.

The invention claimed is:

1. A flight management system for an unmanned aircraft linked to a control station by communication means, said flight management system comprising:
    a first set of a number N of successive navigation functions ($i_{ND}$ with i=1, ... N) remotely situated within the control station,
    a control function on board the aircraft, generating, from guidance setpoints, commands intended to control the aircraft so that it observes the guidance setpoints,
    a second set of a number N of successive navigation functions ($i_{NE}$, with i=1, ..., N) on board the aircraft,
    configuration means for performing a combination of a number N of successive functions, each of the successive functions being chosen from the first and second sets,
    said combination of successive functions generating the guidance setpoints transmitted to the onboard control function.

2. The flight management system of claim 1, in which the first, and respectively the second, sets of successive functions comprise the following three successive navigation functions:
    a remote flight plan construction function, and respectively an onboard flight plan construction function,
    a remote future trajectory construction function, and respectively an onboard future trajectory construction function,
    a remote guidance function, and respectively an onboard guidance function.

3. The flight management system of claim 1, further comprising a performance database on board the aircraft and a remote performance database.

4. The flight management system of claim 1, further comprising a remote navigation database and an onboard navigation database storing navigation data.

5. The flight management system of claim 2, further comprising a remote navigation database and an onboard navigation database storing navigation data, and wherein the configuration means of the flight system are capable of choosing the origin of the guidance setpoints used by the flight plan management function belonging to the combination from remote means for communication with the air traffic control authorities and/or onboard means for communication with the air traffic control authorities and/or onboard guidance setpoint generation means.

6. The flight management system of claim 5, in which the configuration means of the system configure the flight system according to required navigation performance characteristics.

7. The flight management system of claim 6, in which the required navigation performance characteristics depend on at least one navigation parameter and/or at least one certification parameter and/or at least one economic and technical parameter.

8. The flight management system of claim 6, in which the required navigation performance characteristics are predetermined.

9. The flight management system of claim 6, in which the required navigation performance characteristics are variable during a mission of the aircraft.

10. The flight management system of claim 1, in which, for at least one serial number i between 1 and N, the remote navigation function of serial number i ($i_{ND}$) is equal to the onboard function of serial number i ($i_{NE}$).

* * * * *